United States Patent
Ochse

(10) Patent No.: US 10,284,599 B2
(45) Date of Patent: May 7, 2019

(54) METHOD FOR DETECTING AN ATTACK ON A WORKING ENVIRONMENT CONNECTED TO A COMMUNICATION NETWORK

(71) Applicant: DEUTSCHE TELEKOM AG, Bonn (DE)

(72) Inventor: Marco Ochse, Wehrheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 169 days.

(21) Appl. No.: 15/324,745

(22) PCT Filed: Jul. 2, 2015

(86) PCT No.: PCT/EP2015/065143
§ 371 (c)(1),
(2) Date: Jan. 9, 2017

(87) PCT Pub. No.: WO2016/005273
PCT Pub. Date: Jan. 14, 2016

(65) Prior Publication Data
US 2017/0208092 A1    Jul. 20, 2017

(30) Foreign Application Priority Data
Jul. 11, 2014   (EP) ..................................... 14176736

(51) Int. Cl.
*H04L 29/06*   (2006.01)

(52) U.S. Cl.
CPC ...... *H04L 63/1491* (2013.01); *H04L 63/0209* (2013.01); *H04L 63/1416* (2013.01); *H04L 63/1425* (2013.01); *H04L 2463/146* (2013.01)

(58) Field of Classification Search
CPC .................................................. H04L 63/1491
See application file for complete search history.

(56) References Cited

U.S. PATENT DOCUMENTS 8,898,788 B1 *  11/2014  Aziz ....................... G06F 21/00
                                                        726/23
9,009,828 B1 *   4/2015  Ramsey ............. H04L 63/1416
                                                        726/23
(Continued)

FOREIGN PATENT DOCUMENTS

WO    WO 2004056063 A1    7/2004

OTHER PUBLICATIONS

Nagano Kunihasa, "Newest Networking Products Point", Nikkei Windows pro, Japan, Nikkei BP, No. 61, pp. 128-131, Apr. 2002.
(Continued)

*Primary Examiner* — Thaddeus J Plecha
(74) *Attorney, Agent, or Firm* — Leydig, Voit & Mayer, Ltd.

(57) ABSTRACT

A method for detecting an attack on a work environment connected to a communication network includes: electronically emulating, by a network security device connected to the communication network, the work environment; registering, by the network security device, network traffic; comparing, by the network security device, the registered network traffic with predefined network traffic; and triggering, by the network security device, a first attack warning signal in the event of a deviation between the registered network traffic and the predefined network traffic.

9 Claims, 6 Drawing Sheets

(56) References Cited

U.S. PATENT DOCUMENTS

| | | |
|---|---|---|
| 2004/0172557 A1 | 9/2004 | Nakae et al. |
| 2006/0018466 A1 | 1/2006 | Adelstein et al. |
| 2008/0133749 A1* | 6/2008 | Sample ............... G06F 11/3495 709/224 |
| 2008/0271143 A1* | 10/2008 | Stephens ............. H04L 41/5061 726/22 |
| 2010/0115622 A1* | 5/2010 | Amoroso .......... H04L 29/12009 726/25 |
| 2012/0084866 A1 | 4/2012 | Stolfo |
| 2012/0159632 A1* | 6/2012 | Barriga ............... H04L 63/1416 726/24 |
| 2012/0163212 A1* | 6/2012 | Lee ........................ H04L 43/04 370/252 |
| 2013/0145465 A1 | 6/2013 | Wang et al. |
| 2015/0341379 A1* | 11/2015 | Lefebvre ............. H04L 63/1425 726/22 |
| 2017/0208092 A1 | 7/2017 | Ochse |

OTHER PUBLICATIONS

Japanese Notification of Reasons for Refusal, pp. 1-10, dated Apr. 26, 2018.

* cited by examiner

2. Attack warning signal

METHOD FOR DETECTING AN ATTACK ON A WORKING ENVIRONMENT CONNECTED TO A COMMUNICATION NETWORK

CROSS-REFERENCE TO RELATED APPLICATIONS

This application is a U.S. National Phase application under 35 U.S.C. § 371 of International Application No. PCT/EP2015/065143, filed on Jul. 2, 2015, and claims benefit to European Patent Application No. EP 14176736.8, filed on Jul. 11, 2014. The International Application was published in German on Jan. 14, 2016 as WO 2016/005273 A1 under PCT Article 21(2).

FIELD

The present invention relates to a method for detecting an attack on a work environment connected to a communication network, and to a network security system comprising a work environment and a network security element for identifying an attack of this type.

BACKGROUND

Sensitive data that might be of interest to an attacker is often stored on workplace computer systems or on work environments or workplace environments in companies. The theft of company secrets often goes unnoticed as a result of infiltration of malicious programs into the company's own computer network or as a result of spying on work environments of suitable groups of people, for example the board of directors of a company or important members of the public. In this case, self-developing malicious programs tailored individually to the specific use are sometimes used in such attacks and are not detected by the antivirus products obtainable on the market or are only detected very late by such products. Groups of people within a company who are at potential risk can indeed prepare themselves as potential victims of a digital espionage attack; however the exact circumstances such as location, time and form are usually unknown.

SUMMARY

In an exemplary embodiment, the present invention provides a method for detecting an attack on a work environment connected to a communication network. The method includes: electronically emulating, by a network security device connected to the communication network, the work environment; registering, by the network security device, network traffic; comparing, by the network security device, the registered network traffic with predefined network traffic; and triggering, by the network security device, a first attack warning signal in the event of a deviation between the registered network traffic and the predefined network traffic.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
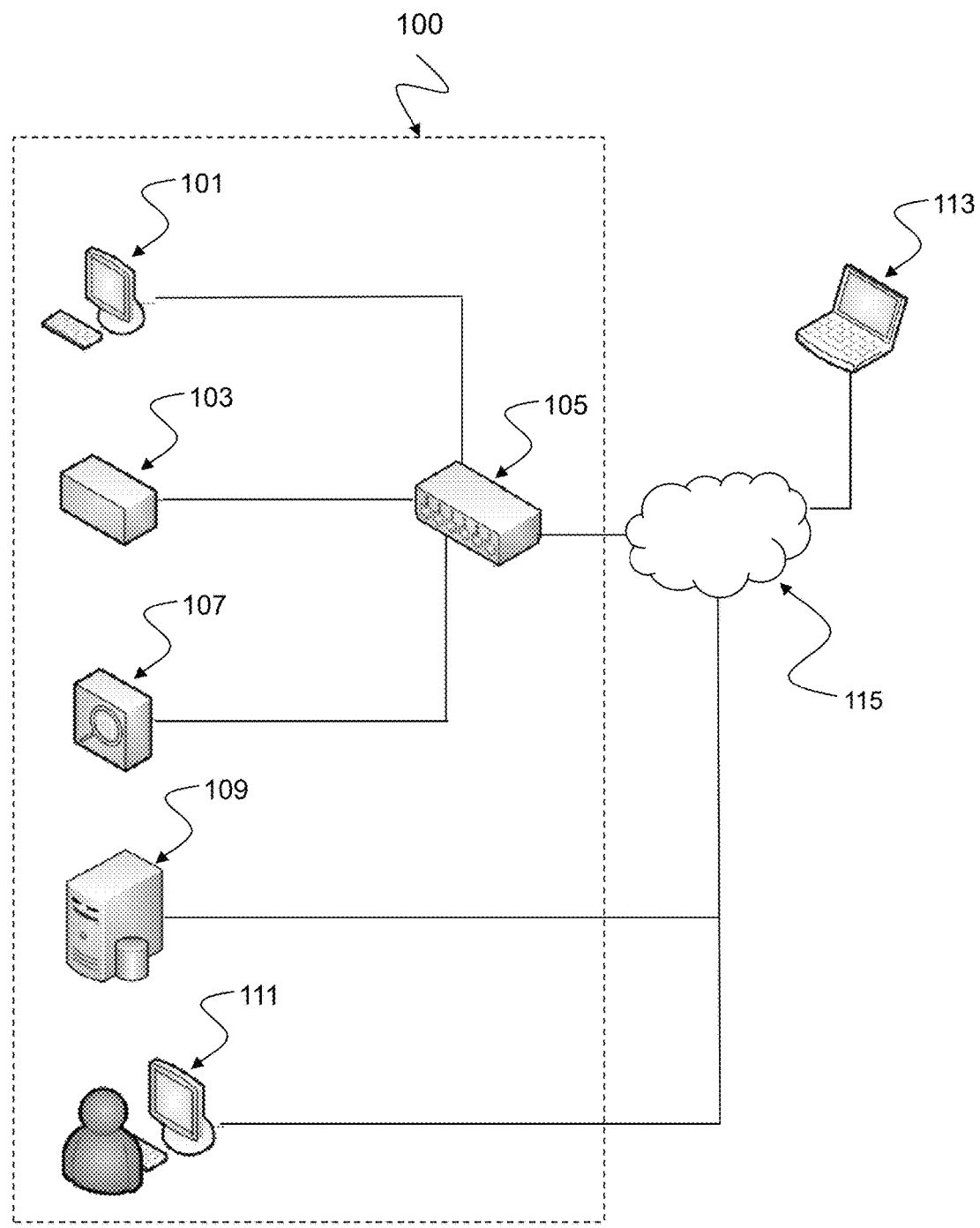
FIG. 1 is a schematic view of a network security system 100 according to one embodiment.

Exemplary embodiments of the present invention are able to detect an attack in a computer network, in particular on a workplace computer system of the computer network.

The methods and systems presented hereinafter can be used for the protection of work environments. A work environment in this case denotes a computer system in a computer network designed for an individual user or an individual user group. By way of example, the employees of a company can use work environments in order to carry out their business-related duties. The work environment can comprise one or more workplace computers, for example a personal computer (PC), a workstation, a notebook, a personal digital assistant (PDA) and/or a smartphone, which are connected to a communication network. The communication network can be a wired network, for example with use of Ethernet, Universal Serial Bus (USB) or cables, etc. The communication network can be a wireless network, for example with use of wireless local area network (WLAN), WiFi, Bluetooth, infrared or a mobile communications standard, such as Long-Term Evolution (LTE), Universal Mobile Telecommunications Service (UMTS), Global System for Mobile communication (GSM), etc.

The methods and systems presented hereinafter can be used to protect a computer network, in particular a work environment in a computer network, against attacks from botnets, in particular against Distributed Denial of Service (DDoS) attacks, spamming attacks, sniffing attacks, phishing attacks, spreading of malware, key-logging, installation of undesired software, identity theft, manipulation of the computer network, etc.

The methods and systems presented hereinafter can be used in the field of information technology (IT). Information technology is a generic term for information and data processing and for the hardware and software required for this purpose. The information technology of a company comprises all technical equipment for generating, processing and forwarding information.

The methods and systems presented hereinafter can be of different types. The individual elements described can be provided by hardware or software components, for example electronic components, which can be produced by various technologies and for example comprise semiconductor chips, application-specific integrated circuits (ASICs), microprocessors, digital signal processors, integrated electric circuits, electro-optical circuits and/or passive components.

A basic concept on which the invention is based is the detection of a possible or imminent attack on the computer network on the basis of a targeted attraction of an attacker in accordance with the honeypot concept, i.e. on the basis of a network security element which emulates a specific work environment that is of value to the attacker. Whilst the attacker attempts to access this emulated work environment, the system can record the activities thus performed by the attacker and, on this basis, the characteristics of the attack or of the attacker can be established. Similar attacks can be detected and/or thwarted using these characteristics.

According to a first aspect, the invention relates to a method for detecting an attack on a work environment connected to a communication network, said method comprising the following steps: electronically emulating the work environment via a network security element connected to the communication network; registering network traffic at the network security element; comparing the registered network traffic with predefined network traffic; and triggering a first attack warning signal in the event of a deviation between the registered network traffic and the predefined network traffic.

The advantage of such a method is that, as a result of the emulation of the work environment by the network security element, an attacker is enticed into directing his attack to the network security element, and therefore the real work environment is protected. The network traffic at the network security element can therefore be registered and analyzed. The comparison with predefined network traffic offers a simple possibility for identifying an irregularity which indicates an attack. The advantage of such a method is therefore the protective effect with respect to the real workplace environment and the ability to respond swiftly when it comes to detecting an attack on a workplace environment and warning against said attack.

According to one embodiment, the registering of the network traffic comprises registering an access rate to the network security element and the comparison of the registered network traffic with the predefined network traffic comprises comparing the registered access rate with a predefined access rate.

The advantage is that the predefined access rate can be easily determined by statistically analyzing activities of a typical user of the work environment, for example. If there is an attack on the work environment or on the network security element, the access rate thus rises significantly, which can be determined easily and reliably.

According to one embodiment, the electronic emulation of the work environment comprises emulating an unprotected work environment comprising at least parts of the same software as are installed on the work environment.

This has the advantage that an attacker then finds the same software on the network security element and believes that this is a workplace environment of interest to him. The attacker will therefore direct his activities to exploring the network security element in the belief that this is a real workplace environment.

According to one embodiment, the work environment is protected and the electronic emulation comprises simulating an unprotected work environment.

This has the advantage that the simulation of an unprotected work environment deflects from the protected work environment(s) and can attract an attacker.

According to one embodiment, a network connection element is interposed between the work environment and the communication network, and a network monitoring element is connected to the network connection element and the method comprises copying network traffic at the network connection element to the network monitoring element.

This has the advantage that the total network traffic from and to the work environment passes via the network connection element, where it can be easily copied and can be supplied to the network monitoring element for further analysis. All activities of the attacker directed to the work environment can thus be registered by the network monitoring element.

According to one embodiment, the method comprises registering the network traffic at the network connection element using the network monitoring element; and triggering a second attack warning signal if an anomaly is identified in the network traffic registered at the network connection element.

This has the advantage that a second attack warning signal is generated independently of the first attack warning signal and therefore an attack is detected even more reliably. The second attack warning signal is based on the identification of an anomaly in the network traffic at the network connection element, i.e. the superordinate network traffic, whereas the first attack warning signal is based on the comparison of the workplace-based network traffic at the network security element with predefined network traffic, i.e. reference network traffic.

According to one embodiment, the identification of the anomaly is based on a detection of abnormal search operations in the registered network traffic.

This has the advantage that the detection of abnormal search operations reliably indicates an attack that is underway or imminent. The computers of a computer network continually generate a large number of warning alerts, for example in the event of a non-functioning software update, when the processor is overloaded, when an update of the software has not yet been performed, when a password has been incorrectly input, when the access to the internet is temporarily not possible, when the access to specific data is not possible, etc. These warning alerts are caused by specific anomalies of the computer network which occur more frequently or less frequently during operation and which usually require the interaction of the user in order to be remedied. By contrast, abnormal search operations are not typical functions of the system. They are to be assessed as critical and indicate a misuse of the computer. An attack can be reliably detected on the basis of abnormal search operations detected in this way.

According to one embodiment, the method comprises recording in real time the network traffic registered at the network connection element in the event of the anomaly being identified.

This has the advantage that the activities of the attacker can be immediately recorded and analyzed, provided an anomaly indicates an imminent attack. The security system can act fast and the response times are very short.

According to one embodiment, the method comprises generating a warning alert on the basis of the first attack warning signal and the second attack warning signal.

This has the advantage that the warning alert is particularly reliable when it is based on two specific attack warning signals which are independent of one another, specifically the first attack warning signal and the second attack warning signal.

According to one embodiment, the generation of the warning alert is also based on further attack warning signals from further work environments of the communication network.

When the generation of the warning alert is also based on further attack warning signals from further work environments of the communication network, the warning alert is even more reliable, since further information is used.

According to one embodiment, the method also comprises logging the registered network traffic at the network security element using a log server when the first attack warning signal is triggered; and logging the registered network traffic at the network connection element using the log server when the second attack warning signal is triggered.

This has the advantage that when logging the network traffic registered at the two network elements, this is available for further analyses. The analysis of the attack pattern can thus be performed more accurately, and more reliable predictions can be made in respect of future attacks.

According to one embodiment, the method comprises detecting characteristic properties of the attack on the basis of the logged network traffic at the network security element and the logged network traffic at the network connection element.

This has the advantage that characteristic properties of the attack can be used in order to detect further attacks based on the same attack characteristics, easily and without great outlay.

According to a second aspect, the invention relates to a network security system comprising: a network connection element 105, which is designed to establish a connection to a communication network 115; and a network security element 103 connected to the network connection element 105, it being possible to connect at least one work environment 101 to the network connection element 105 in order to connect the at least one work environment 101 to the communication network 115, and the network security element 103 being designed to detect an attack on the at least one workspace environment 101 on the basis of an emulation of the at least one workspace environment 101.

The advantage of such a network security system is that, as a result of the emulation of the workplace environment by the network security element, an attacker is enticed to direct his attack to the network security element, and therefore the real workplace environment is protected. The network traffic at the network security element can therefore be registered and analyzed. The advantage of such a network security system is therefore the protective effect with respect to the real workplace environment and the ability to respond swiftly when it comes to detecting an attack on a workplace environment.

According to one embodiment, the network security element comprises the following: an emulator, which is designed to electronically emulate the at least one work environment; a registering unit, which is designed to register network traffic at the network security element; and an attack warning unit, which is designed to compare the registered network traffic with predefined network traffic and to trigger a first attack warning signal in the event of a deviation between the registered network traffic and the predefined network traffic.

The advantage of such a network security system is that the comparison of the registered network traffic with the predefined network traffic provides a simple and reliable possibility for identifying an irregularity which indicates an attack. The first attack warning signal can be triggered so quickly that the user is not surprised by the attack or is made aware of the attack early enough so that there is sufficient time to take appropriate precautionary measures.

According to one embodiment, the network security system comprises a network monitoring element, which is connected to the network connection element, the network monitoring element being designed to register network traffic at the network connection element and to trigger a second attack warning signal if an anomaly is identified in the network traffic registered at the network connection element.

This has the advantage that a second attack warning signal is generated independently of the first attack warning signal and therefore an attack is detected even more reliably. The second attack warning signal is based on the identification of an anomaly in the network traffic at the network connection element, i.e. the superordinate network traffic, whereas the first attack warning signal is based on the comparison of the workplace-based network traffic at the network security element with predefined network traffic, i.e. reference network traffic.

According to one embodiment, the network security system comprises a log server, which is designed to generate a warning alert on the basis of the first attack warning signal and the second attack warning signal, and to log the registered network traffic at the network security element and the registered network traffic at the network connection element, and to detect a characteristic property of the attack on the basis of the logged network traffic.

This has the advantage that when logging the network traffic registered at the two network elements, this is available for further analyses. The analysis of the attack pattern can thus be performed more accurately, and more reliable predictions can be made in respect of future attacks. Furthermore, the characteristic properties of the attack can be used in order to detect further attacks based on the same attack characteristics, easily and without great outlay.

In the following detailed description, reference will be made to the accompanying drawings, which form part of said description and in which specific embodiments in which the invention can be implemented are shown by way of illustration. It goes without saying that other embodiments can also be used and that structural or logical modifications can be made, without departing from the concept of the present invention. The following detailed description therefore is not to be understood in a limiting sense. It also goes without saying that the features of the various embodiments described herein can be combined with one another, unless specifically stated otherwise.

The aspects and embodiments will be described with reference to the drawings, in which like reference numerals relate generally to like elements. For the purpose of providing an explanation, numerous specific details will be presented in the following description in order to provide a thorough understanding of one or more aspects of the invention. However, it may be clear to a person skilled in the art that one or more aspects or embodiments can be implemented with a smaller number of the specific details. In other cases, known structures and elements are illustrated in schematic form in order to facilitate the description of one or more aspects or embodiments. It goes without saying that other embodiments can be used and structural or logical modifications can be made, without departing from the concept of the present invention.

Although a specific feature or a specific aspect of an embodiment might have been disclosed in respect of just one of a number of implementations, a feature of this type or an aspect of this type can additionally be combined with one or more other features or aspects of the other implementations, as can be desired and advantageous for a given or specific application. Furthermore, to the extent to which the terms "contain", "have", "with" or other variants thereof are used either in the detailed description or the claims, such terms shall be understood to be inclusive in a sense similar to the term "comprise". The terms "coupled" and "connected" may have been used together with derivations thereof. It goes without saying that such terms are used in order to specify the fact that two elements cooperate or interact with one another regardless of whether they are in direct physical or electrical contact with one another or are not in direct contact with one another. In addition, the term "by way of example" is to be interpreted merely as an example instead of denoting the best or optimum scenario. The following description therefore is not intended to be understood in a limiting sense.

FIG. 1 is a schematic view of a network security system 100 according to one embodiment.

The network security system 100 comprises a network connection element 105, which is used to establish a connection to a communication network 115, and also a network security element 103 connected to the network connection element 105. At least one work environment 101 is connectable to the network connection element 103 or can be connected to the network connection element 103, in order to connect the at least one work environment 101 to the communication network 115.

The network connection element 105 can connect the work environment 101, the network security element 103, and the network monitoring element 107 to the communication network 115. The network connection element 105 can be, for example, a switch, a gateway or a router, it being possible to connect the various network elements to the switch, the gateway or the router via various ports and it being possible to route said network elements accordingly. The type of routing can be configured via corresponding router protocols or gateway protocols or switch settings.

The network security element 103 is used to detect an attack on the at least one workplace environment 101 on the basis of an emulation of the at least one workplace environment 101. In this case, just one workplace environment 101 can be involved, or a number of different such workplace environments 101.

The network security element 103 can be constructed as shown below in greater detail in FIG. 2. The network security element 103 can comprise an emulator 201, a registering unit 203, and an attack warning unit 205. The at least one work environment 101 can be electronically emulated using the emulator 201. Network traffic 202 at the network security element 103 can be registered using the registering unit 203. The registered network traffic 202 can be compared with predefined network traffic 204 using the attack warning unit 205, and a first attack warning signal 110 can be triggered in the event of a deviation between the registered network traffic 202 and the predefined network traffic 204.

The work environment 101 can be a computer system in a computer network designed for an individual user or an individual user group. By way of example, the work environment can be allocated to an employee of a company so that said employee can perform their business-related duties on said work environment. The work environment can comprise one or more workplace computers, for example a PC, a workstation, a notebook, a PDA, a smartphone, or other types of computers or processors. The communication network 115 can be a wired network, for example an Ethernet, USB or cable network. The communication network 115 can be a wireless network, for example a WLAN, WiFi, Bluetooth or infrared network, or a communication network of a mobile communications standard, such as LTE, UMTS, GSM, etc.

The network security system 100 can also comprise a network monitoring element 107. The network monitoring element 107 can be constructed as shown below in greater detail in FIG. 3. The network monitoring element 107 can be used to register network traffic 302 at the network connection element 105 and to trigger a second attack warning signal 112 if an anomaly 304 is identified in the network traffic 302 registered at the network connection element 105.

The network security system 100 can also comprise a log server 109, which by way of example can be structured as shown below in greater detail in FIG. 4. The log server 109 can generate a warning alert 114 on the basis of the first attack warning signal 110 and the second attack warning signal 112. The log server 109 can log the registered network traffic 202 at the network security element 103 and the registered network traffic 302 at the network connection element 105, and can detect a characteristic property 404 of the attack on the basis of the logged network traffic 402.

As a result of the emulation of the workplace environment 101 by the network security element 103, an attacker 113 should be enticed to direct his attack to the network security element 103, such that the real workplace environment 101 is protected. The network traffic at the network security element 103 can be efficiently registered and analyzed by said network security element. A protective effect in respect of the real workplace environment 101 is thus attained. The network security element 103 can be equipped with fast processors, which allow the network security element 103 to very quickly detect an attack on the workplace environment 101.

A method for detecting an attack can proceed in this case as follows:

1. an (internal) attacker 113 examines the network 115 for targets that can be attacked;
2. the workplace or the work environment 101 is protected;
3. the network security element 103 simulates an unprotected workplace and attracts the attention of the attacker 113;
4a. the attacker 113 finds in (3) a target that can be attacked in a network area of interest, i.e. the network security element 103;
4b. the network monitoring element 107 detects abnormal search operations in the network traffic in real time and communicates these centrally;
4c. the log server 109 logs incoming communications regarding abnormal search operations;
5a. the attacker starts a break-in attempt in (3), i.e. attempts to break into the network security element 103;
5b. the network security element 103 detects a break-an attempt, records the inputs of the attacker 113 in real time and communicates these centrally; the network monitoring element 107 detects properties of an attack in the network traffic and communicates these centrally; the log server 109 logs incoming communications regarding properties of an attack;
6. the log server 109 collates communications from (5b), i.e. communications from the network security element 103 and the network monitoring element 107, and generates a warning report;
7. the security analyst analyses the warning report in the analysis device 111 in order to initiate suitable measures.

Figure 2:
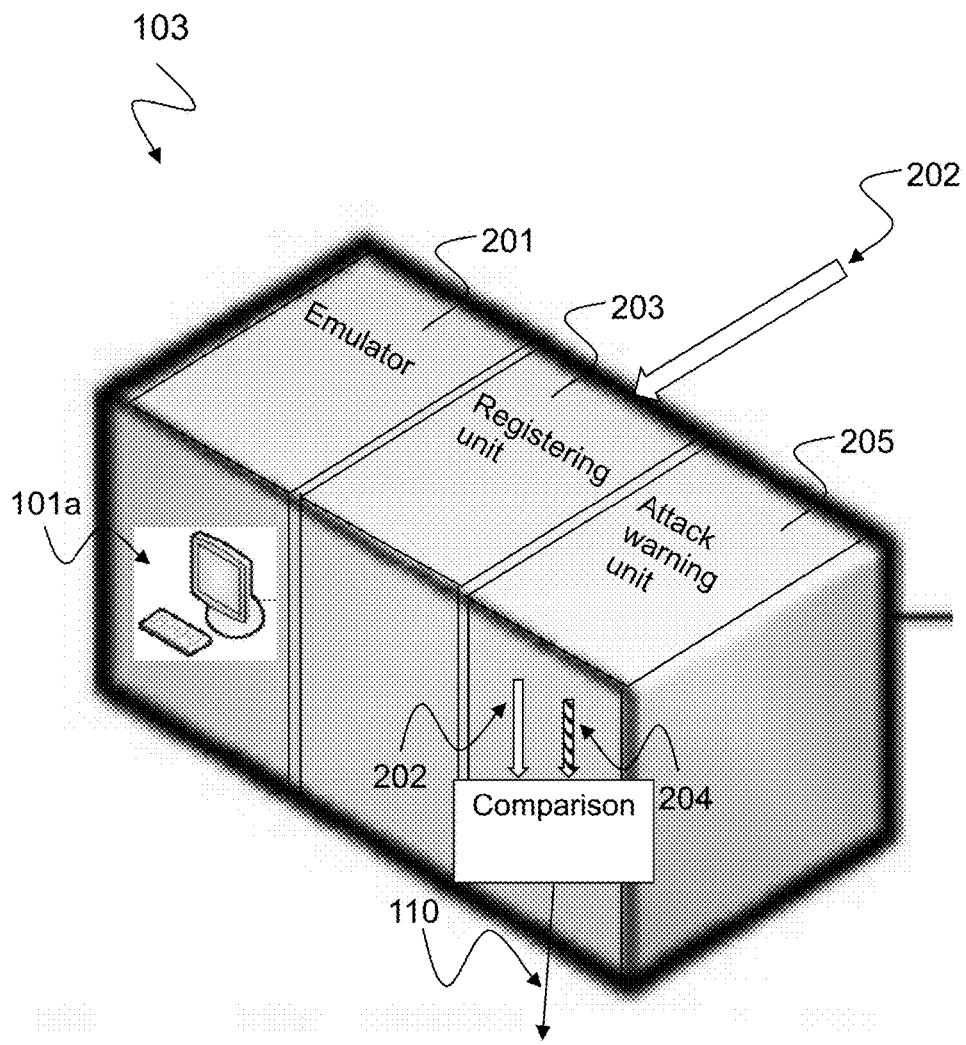
FIG. 2 is a schematic view of a network security element 103 according to one embodiment.

FIG. 2 is a schematic view of a network security element 103 according to one embodiment.

The network security element 103 comprises an emulator 201, a registering unit 203 and an attack warning unit 205. The work environment 101 illustrated above in FIG. 1 can be electronically emulated using the emulator 201, i.e. the emulator 201 can generate or emulate an emulated work environment 101a. The emulator 201 can, for example, install at least parts of the same software on the network security element 103 as are installed on the work environment 101. The attacker 113 then finds the same software on the network security element 103 and believes that this is a workplace environment 101 of interest to him. The attacker 113 is thus tricked into thinking that the network security element 103 is a real work environment 101 in order to prompt the attacker to continue his attack activities, such that his tracks can be followed. The attacker 113 will thus direct his activities to exploring the network security element 103 in the belief that this is a real workplace environment 101.

Network traffic 202 at the network security element 103 can be registered using the registering unit 203. The registered network traffic 202 can be compared with predefined network traffic 204 using the attack warning unit 205, and a first attack warning signal 110 can be triggered in the event of a deviation between the registered network traffic 202 and the predefined network traffic 204. By way of example, the registering of the network traffic 202 at the network security element 103 can be implemented by registering an access rate to the network security element 103. The access rate thus registered can then be compared with a predefined access rate.

The predefined access rate can be easily determined, for example by statistically analyzing activities of a typical user of the work environment 101. If there is an attack on the work environment 101 or on the network security element 103, the access rate thus rises significantly, which can be easily and reliably determined.

Figure 3:
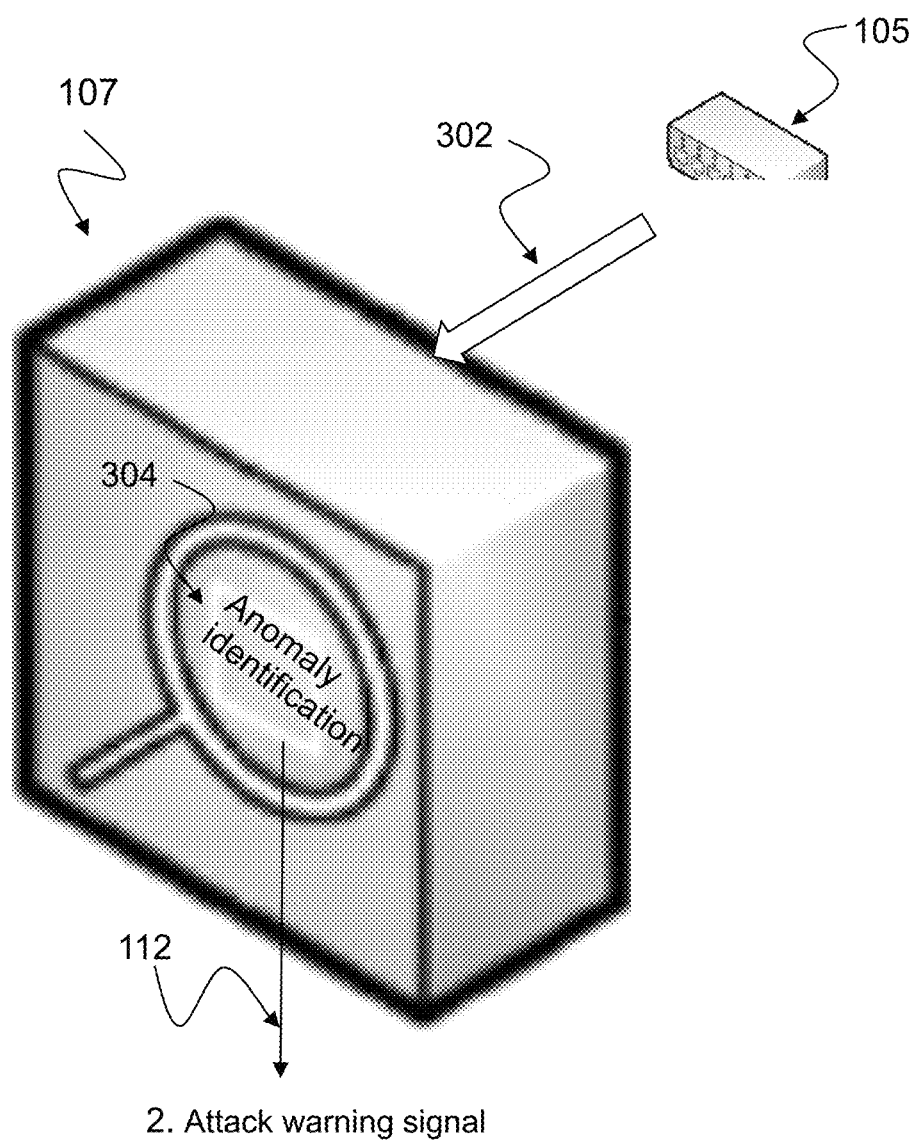
FIG. 3 is a schematic view of a network monitoring element 107 according to one embodiment.

FIG. 3 is a schematic view of a network monitoring element 107 according to one embodiment.

The network monitoring element 107 is connected to the network connection element 105 and can register the network traffic 302 at the network connection element 105. The total network traffic from and to the work environment 101 can thus pass via the network connection element 105, from where it can be easily copied and supplied to the network monitoring element 107 for further analysis. All activities of the attacker 113 directed to the work environment 101 can thus be registered by the network monitoring element 107.

If an anomaly 304 is identified in the network traffic 302 registered at the network connection element 105, the network monitoring element can trigger a second attack warning signal 112. The second attack warning signal 112 can thus be generated independently of the first attack warning signal 110, such that an attack can be detected even more reliably. The second attack warning signal 112 can be based on the identification of an anomaly in the network traffic at the network connection element, i.e. the superordinate network traffic, whereas the first attack warning signal 110 can be based on the comparison of the workplace-based network traffic at the network security element with a predefined network traffic, i.e. a reference network traffic.

The identification of the anomaly 304 can be implemented by a detection of abnormal search operations in the registered network traffic 302. The detection of abnormal search operations can reliably indicate an attack that is underway or imminent. The computers of a computer network continually generate a large number of warning alerts, for example in the case of a non-functioning software update, when the processor is overloaded, when an update of the software has not yet been performed, when a password has been incorrectly input, when the access to the internet is temporarily not possible, when the access to specific data is not possible, etc. These warning alerts are caused by specific anomalies of the computer network which occur more frequently or less frequently during operation and which usually require the interaction of the user in order to be remedied. By contrast, abnormal search operations are not typical functions of the system. They are to be assessed as critical and indicate a misuse of the computer. An attack can be reliably detected on the basis of abnormal search operations detected in this way.

The network monitoring element 107 can comprise a registering unit, for example a memory, through which the network traffic 302 at the network connection element 105 can be registered. The network monitoring element 107 can comprise a detection unit, for example a data correlator, in order to identify an anomaly 304 in the network traffic 302 registered at the network connection element 105, for example by applying correlation methods. The network monitoring element 107 can comprise a warning unit, through which an attack warning signal 112 can be generated if an anomaly 304 is identified. The network monitoring element 107 can comprise a communication interface, via which the attack warning signal 112 can be forwarded to further components in the network security system 100, for example as shown in FIG. 1, to the log server 109 and/or the analysis device 111 via the network connection element 105 and the communication network 115, or, as not shown in FIG. 1, to the log server 109 and/or the analysis device 111 via an independent interface bypassing the communication network 115.

Figure 4:
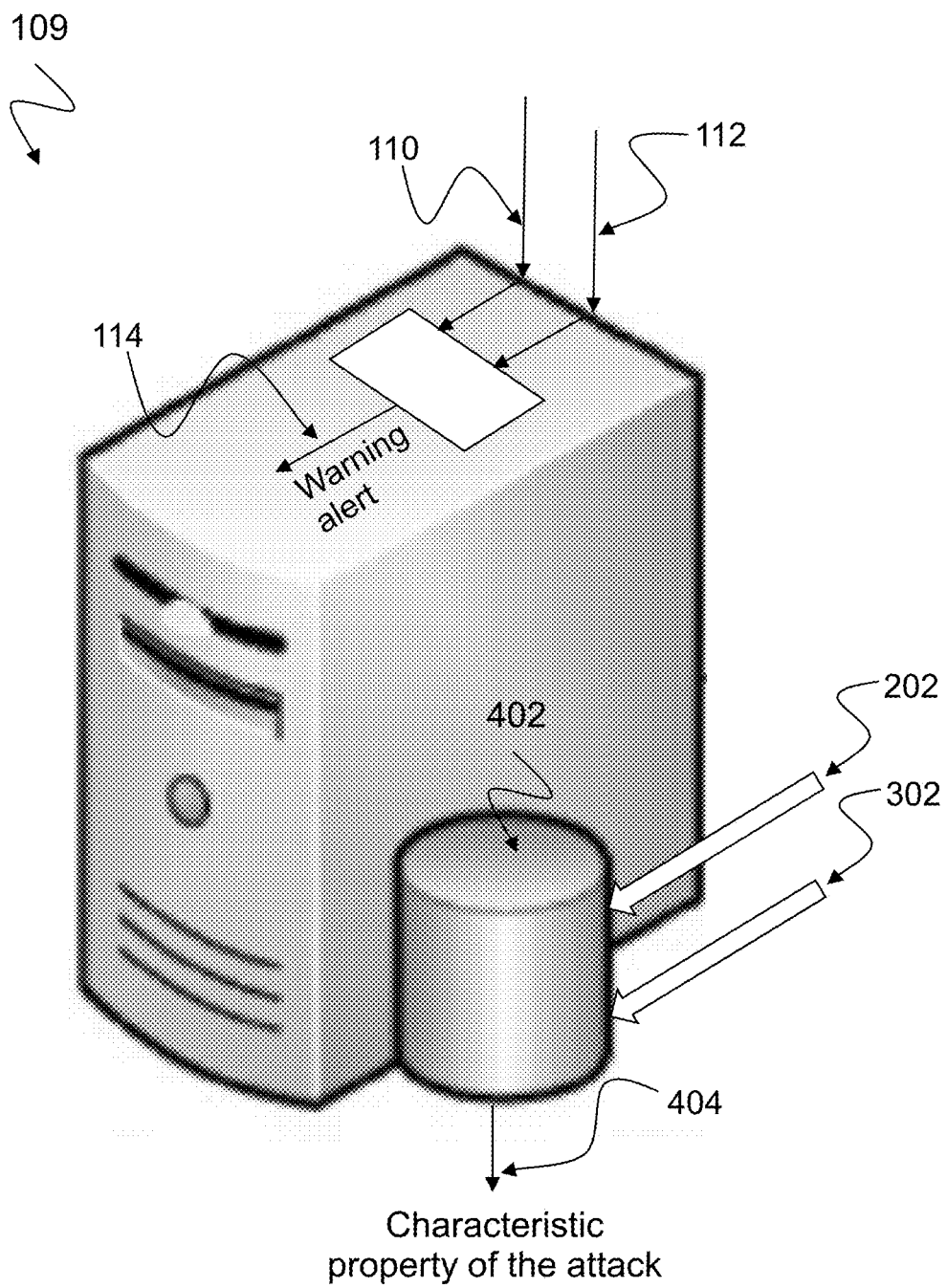
FIG. 4 is a schematic view of a log server 109 according to one embodiment.

FIG. 4 is a schematic view of a log server 109 according to one embodiment.

The log server 109 can generate a warning alert 114 on the basis of the first attack warning signal 110 and the second attack warning signal 112. The log server 109 can log the registered network traffic 202 at the network security element 103 and the registered network traffic 302 at the network connection element 105, for example in a log memory, and can detect a characteristic property 404 of the attack on the basis of the logged network traffic 402.

Due to the logging of the network traffic 202, 302 registered at the two network elements 103, 105, this is available for further analyses. The analysis of the attack pattern can thus be performed more accurately, and more reliable predictions can be made in respect of future attacks. Characteristic properties of the attack detected by the log server 109 can be used in order to detect further attacks based on the same attack characteristics, easily and without great outlay.

The logs recorded by the log server 109 and the characteristic properties 404 of the attack established by the log server 109 can be made available to an analysis device 111, as illustrated in FIG. 1.

The analysis device 111 may be an SIEM (security information and event management) system for example. The analysis device 111 by way of example can combine security information management (SIM) with security event management (SEM) and it can implement a real-time analysis of security alarms. The analysis device 111 and/or the log server 109 can be used in order to record security-relevant data and in order to generate reports for compliance applications.

Figure 5:
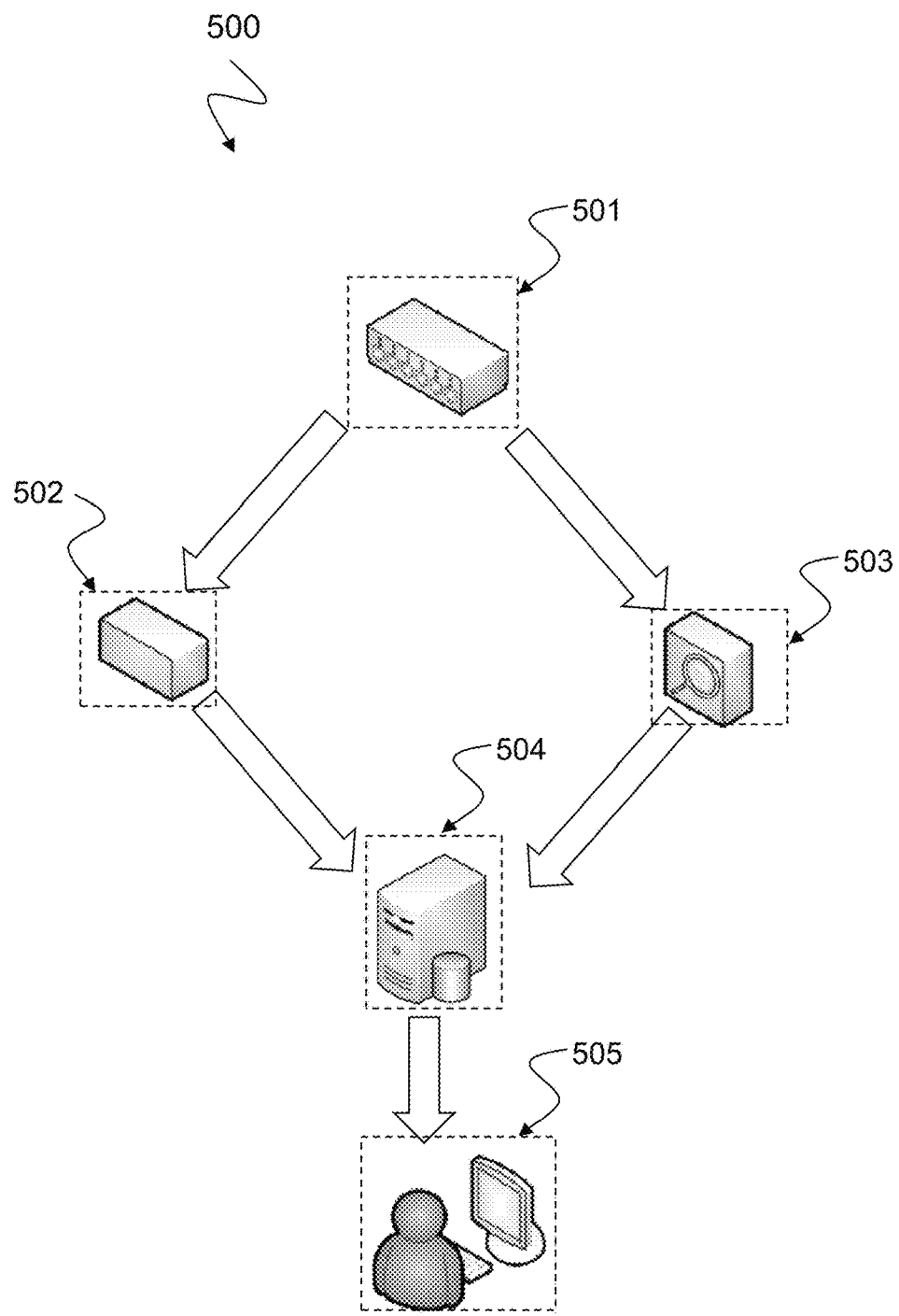
FIG. 5 is a schematic view of a method 500 for detecting an attack on a work environment according to one embodiment.

FIG. 5 is a schematic view of a method 500 for detecting an attack on a work environment according to one embodiment.

The method 500, in a first method step 501, can comprise configuring a network connection element, for example a network connection element 105 according to the description in relation to FIG. 1. Protected workplace systems can be connected to the network connection element 105, for example workplace systems 101 according to the view in FIG. 1, which may be of interest to an attacker 113. The configuration of the network connection element 105 can provide for all "traffic", i.e. network traffic, to be copied to a port, to which a network monitoring element, for example a network monitoring element 107 according to the view of FIG. 1, is connected.

Alternatively, the method 500 can be carried out with an already configured network connection element.

The method 500, in a second method step 502, can comprise simulating a workplace system, for example a work environment 101 according to the description in relation to FIG. 1, using a network security element 103. The simulation of an unprotected workplace system is intended to deflect from the protected workplace systems and to attract the attention of an attacker.

The method 500, in a third method step 503, can comprise checking the incoming and outgoing network traffic, for example using a network monitoring element 107, as described in detail in FIG. 1. The network monitoring element 107 is able to inspect the incoming and outgoing network traffic to/from the network connection element 105 for suspicious patterns.

If the network traffic is encrypted, merely the network and log data from the connection are available for analysis. The content of a data item encrypted by the transfer can then be further analyzed when the key information forming the basis of the connection is available to the network monitoring element 107.

The method 500, in a fourth method step 504, can comprise an analysis and the creation of a warning report. If a break-in attempt is detected by the network security element 103, the inputs of the attacker can be logged and centrally registered. If suspicious patterns are discovered by the network monitoring element 107, alarms can be generated and forwarded to a central system for consolidation, for example to the log server 109, as described in FIGS. 1 and 4.

By combining the simulation of an unprotected workplace with a network monitoring element and the central logging, it is now possible centrally to bring the events into a causal relationship and to draw conclusions with regard to the attacker.

Communications from other network areas can be collected centrally in accordance with the same structure. The more data that can be obtained in this form, the higher the quality of the conclusion with regard to an executed attack, i.e. incorrect conclusions can be reduced.

The method 500, in a fifth method step 505, can comprise initiating suitable measures by a security analyst. The security analyst can obtain a warning alert in an automated manner, for example in the form of an email, Short Message Service (SMS), app, etc., and can initiate suitable measures thereupon.

Figure 6:
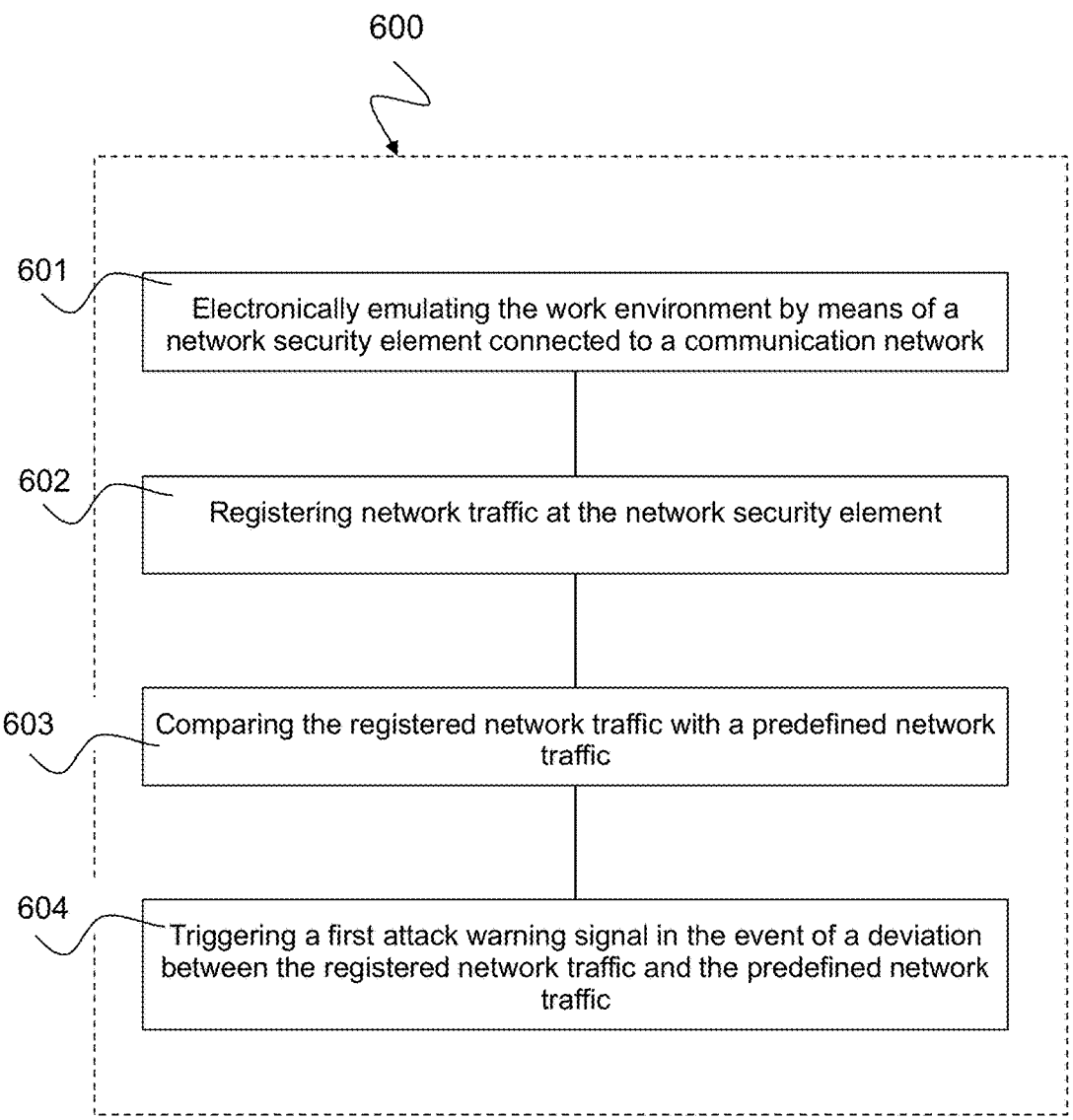
FIG. 6 is a schematic view of a method 600 for detecting an attack on a work environment according to a further embodiment.

FIG. 6 is a schematic view of a method 600 for detecting an attack on a work environment connected to a communication network 115, for example a work environment 101 as illustrated in FIG. 1, according to a further embodiment.

The method 600 comprises electronically emulating 601 the work environment 101 using a network security element connected to the communication network 115, for example a network security element 103 as illustrated in FIG. 1. The method 600 comprises registering 602 network traffic 202 at the network security element 103. The method 600 comprises comparing 603 the registered network traffic 202 with predefined network traffic 204. The method 600 comprises triggering 604 a first attack warning signal 110 in the event of a deviation between the registered network traffic 202 and the predefined network traffic 204, for example in accordance with the description in relation to FIGS. 1 and 2.

The registering 602 of the network traffic can comprise registering an access rate to the network security element 103. The comparison 603 of the registered network traffic 202 with the predefined network traffic 204 can comprise comparing the registered access rate with a predefined access rate.

The electronic emulating 601 of the work environment 101 can comprise emulating an unprotected work environment 101a which comprises at least parts of the same software as are installed on the work environment 101.

A network connection element 105 can be interposed between the work environment 101 and the communication network 115, for example in accordance with the view in FIG. 1, and a network monitoring element 107 can be connected to the network connection element 105. The method 600 can comprise copying network traffic at the network connection element 105 to the network monitoring element 107.

The method 600 can also comprise registering the network traffic 302 at the network connection element 105 using the network monitoring element 107; and triggering a second attack warning signal 112 if an anomaly 304 is identified, for example in accordance with the description in relation to FIG. 3, in the network traffic 302 registered at the network connection element 105. The identification of the anomaly 304 can be based on a detection of abnormal search operations in the registered network traffic 302.

The method 600 can also comprise recording in real time the network traffic 302 registered at the network connection element 105 in the event of the anomaly 304 being identified. The method 600 can comprise generating a warning alert 114 on the basis of the first attack warning signal 110 and the second attack warning signal 112, for example in accordance with the description in relation to FIGS. 1 to 3. The generation of the warning alert 114 can also be based on further attack warning signals from further work environments of the communication network 115.

The method 600 can also comprise logging the registered network traffic 202 at the network security element 103 using a log server 109 when the first attack warning signal 110 is triggered, for example in accordance with the description in relation to FIGS. 1 and 4. The method 600 can comprise logging the registered network traffic 302 at the network connection element 105 using the log server 109 when the second attack warning signal 112 is triggered, for example in accordance with the description in relation to FIGS. 1 and 4. The method 600 can also comprise detecting characteristic properties 404 of the attack on the basis of the logged network traffic 202 at the network security element 103 and the logged network traffic 302 at the network connection element 105.

The method 600 describes a generalization of the method steps 1 to 7 explained at the end of the description in relation to FIG. 1 and of the method 500 shown in FIG. 5.

One aspect of the invention also comprises a computer program product which can be loaded directly into the internal memory of a digital computer and comprises software code portions through which the methods 500, 600 described in relation to FIG. 5 or FIG. 6 can be executed when the product runs on a computer. The computer program product can be stored on a computer-suitable medium and comprises the following: a computer-readable program which allow a computer to electronically emulate 601 a work environment using a network security element connected to the communication network; to register 602 network traffic at the network security element; to compare 603 the registered network traffic with a predefined network traffic; and to trigger 604 a first attack warning signal in the event of a deviation between the registered network traffic and the predefined network traffic. The computer can be a PC, for example a PC of a computer network. The computer may be a chip, an ASIC, a microprocessor or a signal processor, and can be arranged in a computer network, for example a computer network as described in FIGS. 1 to 4.

It goes without saying that the features of the various embodiments described herein by way of example can be combined with one another, unless specifically stated otherwise. As presented in the description and the drawings, individual elements which have been presented in a manner connected to one another do not have to be directly connected to one another; intermediate elements can be provided between the connected elements. It also goes without saying that embodiments of the invention can be implemented in individual circuits, partially integrated circuits or fully integrated circuits or software. The term "by way of example" is intended merely as an example and not as the best or optimum scenario. Specific embodiments have been illustrated and described herein; however it is clear to a person skilled in the art that a large number of alternatives and/or equivalent implementations can be realized instead of the shown and described embodiments, without departing from the concept of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100: network security system
101: work environment
101a: emulated work environment
103: network security element
105: network connection element
107: network monitoring element
109: log server
110: first attack warning signal
111: analysis device
112: second attack warning signal
113: attacker
114: warning alert
115: communication network
201: emulator
203: registering unit
205: attack warning unit
202: registered network traffic at the network security element
204: predefined network traffic
302: registered network traffic at the network connection element
304: anomaly
402: logged network traffic
404: characteristic properties of the attack
500: method for detecting an attack on a work environment
501: first method step: configuring the network connection element
502: second method step: simulating a workplace system
503: third method step: checking the incoming and outgoing network traffic
504: fourth method step: analysis and creation of a warning report
505: fifth method step: initiating suitable measures by a security analyst
600: method for detecting an attack on a work environment
601: first method step: electronically emulating the work environment
602: second method step: registering network traffic at the network security element
603: third method step: comparing the registered network traffic with a predefined network traffic
604: fourth method step: triggering a first attack warning signal

The invention claimed is:

1. A method for detecting an attack on a work environment connected to a communication network, the method comprising:
electronically emulating, by a network security device connected to the communication network, the work environment;
registering, by the network security device, network traffic at the network security device;
comparing, by the network security device, the network traffic registered at the network security device with predefined network traffic; and
triggering, by the network security device, a first attack warning signal in event of a deviation between the network traffic registered at the network security device and the predefined network traffic;
wherein a network connection device is interposed between the work environment and the communication network, and wherein a network monitoring device is connected to the network connection device;
wherein the method further comprises copying network traffic at the network connection device to the network monitoring device; and
wherein the method further comprises:
registering, by the network monitoring device, network traffic at the network connection device;

triggering a second attack warning signal if an anomaly is identified in the network traffic registered at the network connection device; and generating a warning alert based on the first attack warning signal and the second attack warning signal.

2. The method according to claim 1, wherein registering the network traffic at the network security device comprises registering an access rate with respect to the network security device; and wherein comparing the network traffic registered at the network security device with the predefined network traffic comprises comparing the registered access rate with a predefined access rate.

3. The method according to claim 1, wherein electronically emulating the work environment comprises emulating an unprotected work environment which comprises at least part of software installed on the work environment.

4. The method according to claim 1, wherein the identification of the anomaly is based on a detection of abnormal search operations in the network traffic registered at the network connection device.

5. The method according to claim 1, further comprising:
recording in real time the network traffic registered at the network connection device in event of the anomaly being identified.

6. The method according to claim 1, wherein the generation of the warning alert is also based on further attack warning signals from further work environments of the communication network.

7. The method according to claim 1, further comprising:
logging the registered network traffic at the network security device using a log server when the first attack warning signal is triggered; and logging the registered network traffic at the network connection device using the log server when the second attack warning signal is triggered.

8. The method according to claim 7, comprising:
detecting characteristic properties of the attack based on the logged network traffic at the network security device and the logged network traffic at the network connection device.

9. A network security system, comprising:
a network connection device, configured to establish a connection to a communication network; and a network security device connected to the network connection device;

wherein at least one work environment is connectable to the network connection device in order to connect the at least one work environment to the communication network; and wherein the network security device is configured to detect an attack on the at least one workplace environment based on an emulation of the at least one workplace environment;

wherein the network security device is further configured to:
electronically emulate the at least one work environment;

register network traffic at the network security device; and compare the registered network traffic with predefined network traffic and to trigger a first attack warning signal in event of a deviation between the registered network traffic and the predefined network traffic;

wherein the network security system further comprises:
a network monitoring device connected to the network connection device, wherein the network monitoring device is configured to register network traffic at the network connection device and to trigger a second attack warning signal if an anomaly is identified in the network traffic registered at the network connection device; and a log server, configured to generate a warning alert based on the first attack warning signal and the second attack warning signal, to log the network traffic registered at the network security device and the network traffic registered at the network connection device, and to detect a characteristic property of the attack based on the logged network traffic.

* * * * *